(12) United States Patent
Matsuzaki et al.

(10) Patent No.: US 6,342,743 B1
(45) Date of Patent: Jan. 29, 2002

(54) SPINDLE MOTOR STRUCTURE USING CERAMIC BALL BEARING FOR HARD DISK DRIVE

(75) Inventors: Shinichi Matsuzaki, Fujisawa; Akihiro Ohyama, Tokyo-to; Koichi Takeuchi, Yamato; Kiyoshi Satoh, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/617,633

(22) Filed: Jul. 17, 2000

(30) Foreign Application Priority Data

Sep. 24, 1999 (JP) .......................................... 11-270228

(51) Int. Cl.$^7$ ............................................. H02K 5/16
(52) U.S. Cl. ....................................................... 310/90
(58) Field of Search .............................. 310/12, 13, 14, 310/90, 216, 254; 360/99.08, 97.02, 97.07, 78.12, 78.13; 384/107, 613, 615

(56) References Cited

U.S. PATENT DOCUMENTS 5,729,404 A * 3/1998 Dunfield et al. ......... 360/99.08
6,135,641 A * 10/2000 Smith ......................... 384/493
6,229,664 B1 * 5/2001 Albrecht et al. .............. 360/75

\* cited by examiner

*Primary Examiner*—Nestor Ramirez
*Assistant Examiner*—Judson H. Jones
(74) *Attorney, Agent, or Firm*—Robert B. Martin; Bracewell & Patterson, L.L.P.

(57) ABSTRACT

A bearing mechanism of the present invention has a first bearing and a second bearing disposed at different positions in an axial direction. Each bearing has an inner race, an outer race, and balls. A shaft holds the inner races of both bearings in an axially separated manner, while a supporting member holds the outer races of both bearings in an axially separated manner. The balls of the bearings have a different coefficient of linear expansion than that of the inner and outer races. The inner and outer races of each of the bearings are fixed in an axially shifted manner, whereby pre-loaded pressures are applied between both the inner race and the balls, and between both the outer race and the balls. As the temperature changes, the supporting member has a compensation member that can change a distance between the outer races in a changing ratio different from a changing ratio of the distance between the inner races.

11 Claims, 6 Drawing Sheets

SPINDLE MOTOR STRUCTURE USING CERAMIC BALL BEARING FOR HARD DISK DRIVE

BACKGROUND OF THE INVENTION

1. Technical Field

The present invention relates to a disk drive, a spindle motor, and a bearing mechanism for the spindle motor. In particular, the present invention relates to suppressing changes in the pre-load pressure of a bearing as a result of temperature change of the bearing.

2. Description of the Related Art

Referring to FIG. 7, a sectional view of a conventional spindle motor used in a hard disk drive is shown. A cylindrical shaft 102 made of stainless steel is mounted in the center of a bottom part 101 covering a bottom surface part of a spindle motor 100. Shaft 102 fixedly holds inner races 103a and 104a, which are included in a pair of bearings 103 and 104, respectively. A space is left in the direction of a central axis 102X of shaft 102. Outer races 103b and 104b of bearings 103 and 104, respectively, are fixedly held by outer race holding members 106 and 107, whose inner diameters are formed slightly larger than one of an inner circumferential surface 105a. A space is left in the inner circumferential surface 105a of a hub 105.

An annular concave part 108 is formed in the hub 105, made of stainless steel, and faces the bottom part 101. Rotor magnets 109 are disposed on the inner circumferential surface 108a. A cylindrical central wall part 101a, which projects upward so as to support the shaft 102, is formed in a central part of the bottom part 101. On an outer circumferential surface of central wall part 101a, a selected number of core members 110, where stator coils 111 are wound, are fixedly disposed at equal intervals in the circumferential direction with an end part of each core member 110 facing each rotor magnet 109. An outer circumferential surface 105b of the hub 105 has a predetermined outer diameter and length in the axial direction such that the outer circumferential surface 105b fits within center holes of a selected number of disks (not shown).

If bearing steel is used to form both the balls and the inner and outer races of the bearing, the conventional bearing mechanism of the spindle motor that is described above will experience several hardness problems. For example, when the bearing is used at high rotational speeds (e.g., 10,000 rpm), the durability and bearing life are diminished due to lack of hardness.

In a contact-start-stop hard disk drive, disk vibration is suppressed because the sliders are in contact with the disk surfaces when the disks are not rotating. However, in a hard disk drive having a load/unload mechanism such as that shown in FIG. 1 (described below), disk vibration is not suppressed since the actuator arm is not in contact with the hub, especially when unloading.

Therefore, if steel balls are used in a bearing of a spindle motor in a hard disk drive having a load/unload mechanism, fluctuations with small amplitude occur between the inner and outer races and steel balls of the bearing when the disk drive is transported, etc. Consequently, fretting occurs in the contacting parts. Since the contacting surfaces become unlubricated because of extrusion of lubricant from the contacting surfaces, the contacting surfaces generate reddish brown abrasion powder, are eventually worn out, and concave surfaces are formed in them.

If ceramic balls are used in the bearing of the conventional spindle motor described above, some of these problems are alleviated. Unfortunately, a new problem occurs as follows. A ceramic ball has a coefficient of linear expansion that is smaller than that of the other bearing members formed from bearing steel. For example, even if a mechanism is designed so that an optimum pre-loaded pressure may be applied at room temperature, size ratios of the ceramic ball to other members decrease as temperature rises, and hence the pre-loaded pressure decreases. Hence, it is conceivable to set the pre-loaded pressure at room temperature to be higher than the optimum value supposing the use of the bearing at high temperature. Unfortunately, the bearing cannot be used at or below room temperature.

Thus, an object of the present invention is to provide a ceramic ball bearing mechanism that maintains stable operation, in spite of temperature changes, by suppressing changes in pre-load pressure that are caused by the temperature change.

SUMMARY OF THE INVENTION

A bearing mechanism of the present invention has a first bearing and a second bearing disposed at different positions in an axial direction. Each bearing has an inner race, an outer race, and rolling balls. A shaft holds the inner races of both bearings in an axially separated manner, while a supporting member holds the outer races of both bearings in an axially separated manner. The rolling balls of the bearings have a different coefficient of linear expansion than that of the inner and outer races. The inner and outer races of each of the bearings are fixed in an axially shifted manner, whereby pre-loaded pressures are applied between both the inner race and the balls, and between both the outer race and the balls. As the temperature changes, the supporting member has a compensation member that can change a distance between the outer races in a changing ratio different from a changing ratio of the distance between the inner races.

In one version, the inner races and the outer races are made of bearing steel, and the balls are ceramic. In another version, the shaft is made of stainless steel and the compensation member is made of aluminum.

A spindle motor of another form of the present invention has the bearing mechanism described above, and a bottom part fixedly supporting the shaft. The rotor magnets are held by the supporting member and are disposed along a circumference whose center is a central axis of the shaft. The cores are fixedly disposed on the shaft and have stator coils wound around the cores so that end parts of the coils may face the rotor magnets, respectively.

A spindle motor of still another form of the present invention has rotor magnets that are held by holding means, which is formed on the shaft in one piece, and are disposed along a circumference whose center is a central axis of the shaft. The cores are fixedly disposed on the shaft and have stator coils wound around the cores so that end parts of the cores may face the rotor magnets, respectively.

A disk drive of a further form of the present invention has the spindle motor described above, a disk that is held by a rotary part of this spindle motor and rotates in one piece, and an actuator arm holding a head scanning a recording surface of the disk.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
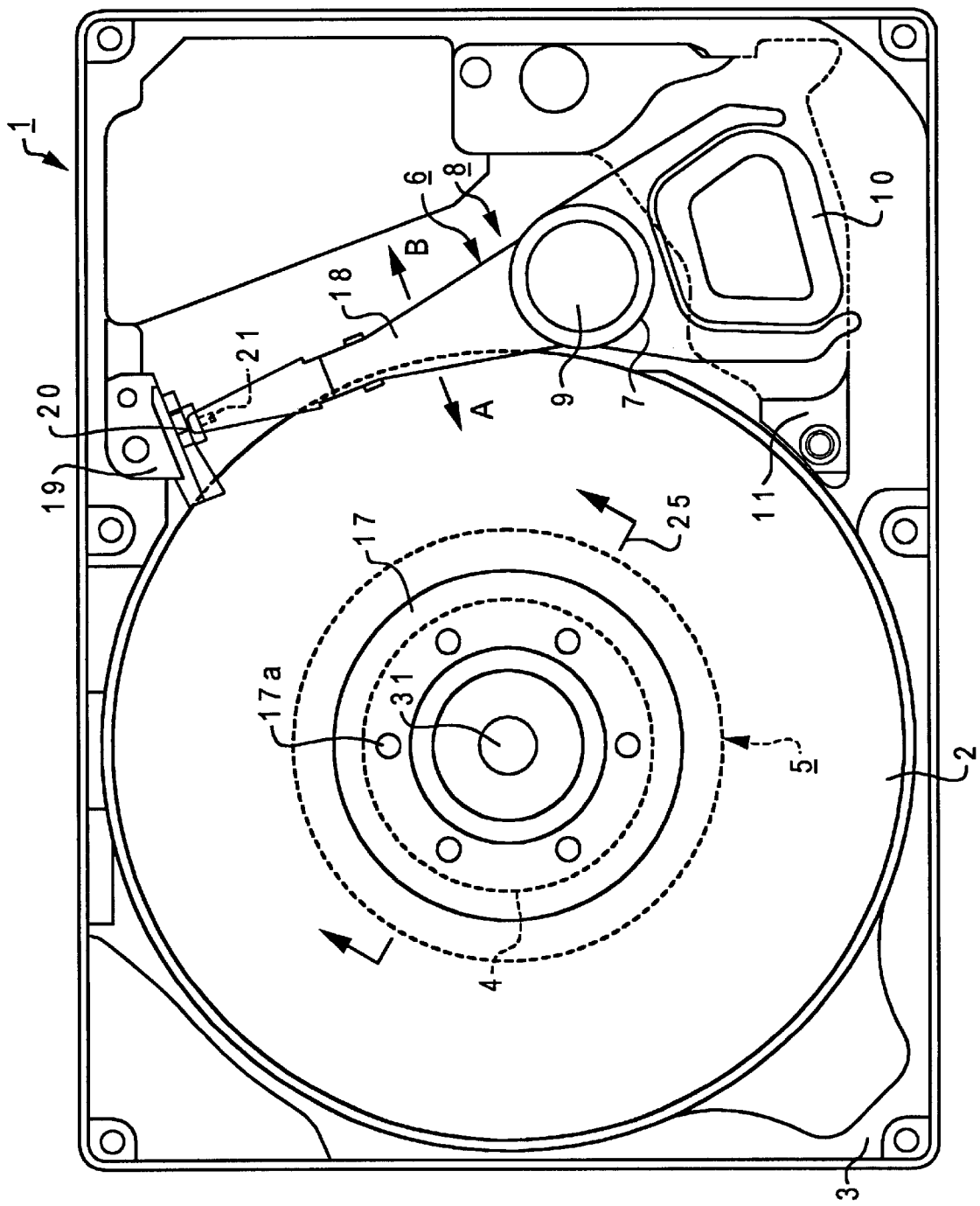
FIG. 1 is a top view of a hard disk drive showing a first embodiment of the present invention.
Figure 2:
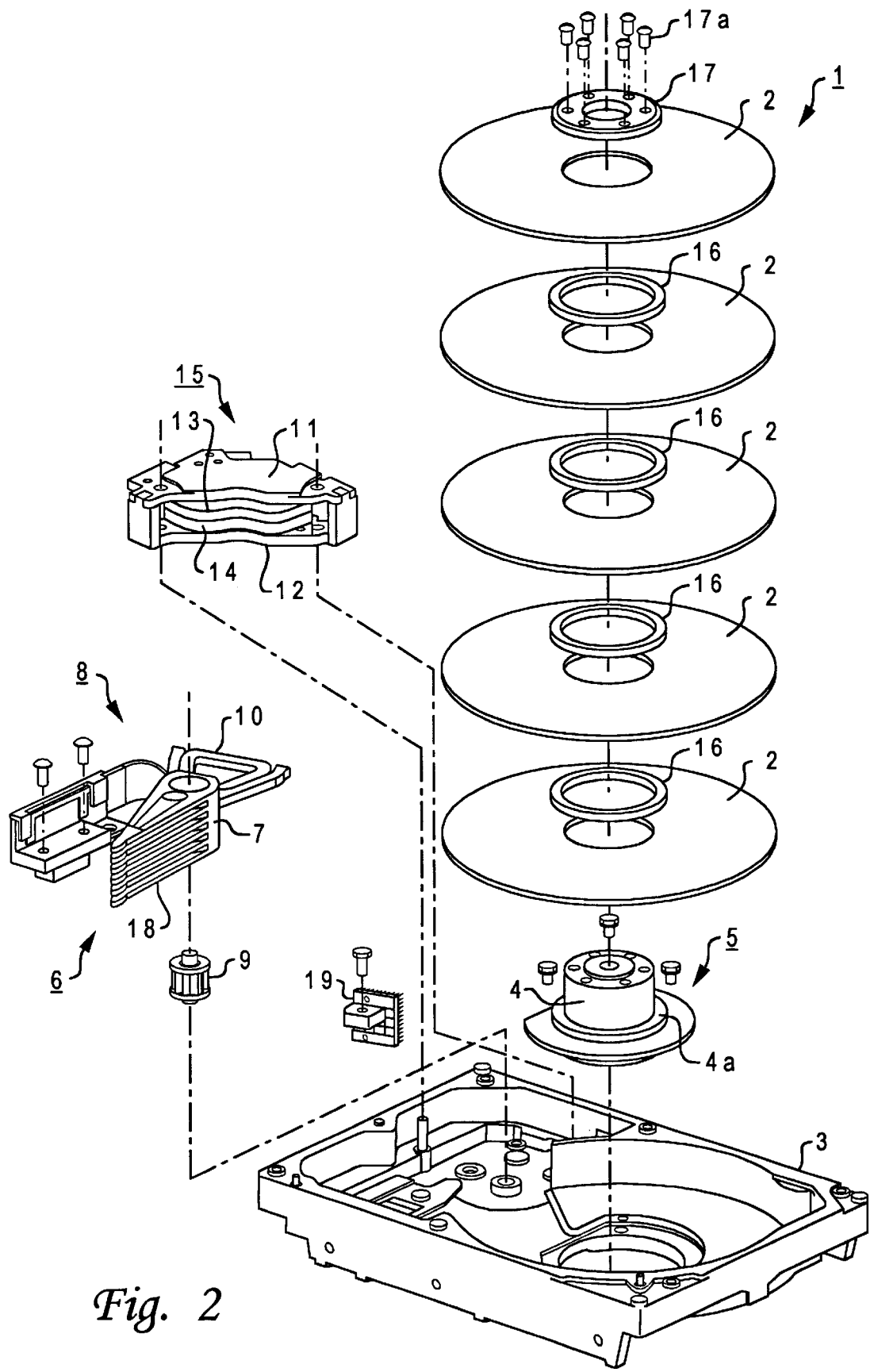
FIG. 2 is an exploded perspective view of the hard disk drive of FIG. 1.
Figure 3:
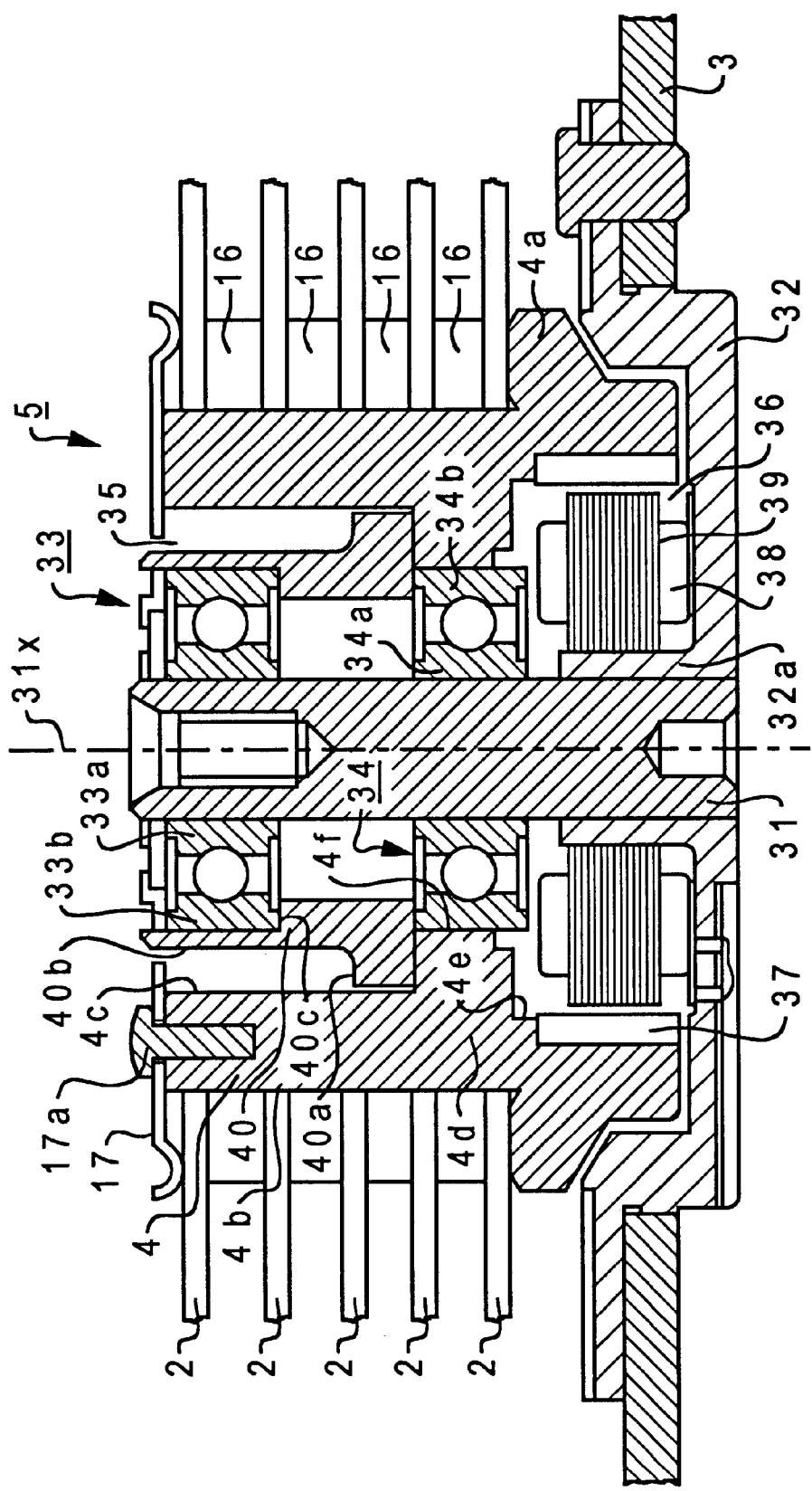
FIG. 3 is a sectional side view of a spindle motor 5 taken along the line 25 of FIG. 1.

FIG. 1 is a top view of a hard disk drive showing a first embodiment of the present invention, and FIG. 2 is an exploded perspective view showing a principal part of a hard disk drive. FIG. 3 is a cross-sectional view of a spindle motor 5 taken on an index line 25 of FIG. 1.

A spindle motor 5 described later is disposed at a predetermined position with screws on a base 3 of a hard disk drive 1. Five disks 2 are stacked with spacers 16 intervening between respective disks, and are placed on a flange part 4a of a hub 4 such that center holes of respective disks fit with the hub 4 of the spindle motor 5. Furthermore, a top clamper 17 disposed on a top of the disks 2 elastically depresses the uppermost disk 2 by being fixed to the hub 4 with screws 17a (FIG. 3), and hence sandwiches the five disks 2 with the flange part 4a of the hub 4. Owing to this, the five disks 2 are fixed on the hub 4 in one piece, and are rotatably driven by the spindle motor 5.

An actuator arm 8 is formed with an arm part 6 and a coil support member 7, supporting a flat coil 10, in one piece, and is rotatably held by a rotary shaft 9 planted on the base 3. The flat coil 10 forms a voice coil motor (hereinafter, this is called a VCM) with a stator magnet 13 fixed on an upper stator magnet holding plate 11 of a magnet unit 15 (FIG. 2), and a stator magnet 14 fixed on a lower stator magnet holding plate 12.

Therefore, the magnet unit 15 is fixed on the base 3 such that the flat coil 10 intervenes between a pair of stator magnets 13 and 14. In addition, in FIG. 1, a principal part of the upper stator magnet holding plate 11 is shown with being partially cut away, and its outline is shown by dashed lines.

The arm part 6 has a plurality of suspensions 18 that are disposed with leaving spaces respectively and are connected to the coil support member 7. Each suspension 18 has a slider 21 (FIG. 1), having a head scanning a recording surface of the disk 2, in an end part.

A ramp 19 fixed on the base 3 is formed such that a tub 20 (FIG. 1) in the tip part of the arm part 6 is placed on the ramp 19 when the actuator arm 8 is unloaded and the sliders 21 can smoothly move above recording surfaces of the disks when the actuator arm 8 is loaded with rotating in the direction shown by an arrow A.

In FIG. 3, a cylindrical shaft 31 made of stainless steel is planted in the center of a bottom part 32 that forms a bottom surface part of the spindle motor 5 and is screwed on the base 3 of the hard disk drive 1 (FIG. 1). Furthermore, the shaft 31 fixedly holds respective inner races 33a and 34a of a pair of bearings 33 and 34 with leaving a predetermined space in the direction shown by a central axis 31X.

The hub 4 made of stainless steel is approximately cylindrical, and the flange 4a is formed near a lower end part of its outer circumferential surface 4b. As described above, the plurality of disks 2 whose center holes fit with the outer circumferential surface 4b are placed on the hub 4. On the other hand, in its cylindrical inside, a stator coil housing 36 and a sleeve housing 35 are formed, both housings which are separated by a protrusion 4d, protruding from an inner circumferential surface to a central part in some extent, and have inner diameters different from each other.

The protrusion 4d holds the outer race 34b in one piece with an inner circumferential surface 4f that is formed by an end of the protrusion 4d and contacts to this outer race 34b of the bearing 34. Rotor magnets 37 are disposed on an inner circumferential surface 4e of the stator coil housing 36 facing the bottom part 32.

In a central part of the bottom part 32, a cylindrical central wall part 32a is formed, the wall part 32a protruding upward for supporting the shaft 31. A predetermined number of core members 39, where stator coils 38 are wound, are fixedly disposed at equal intervals in circumferential direction in an outer circumferential surface of this central wall part 32a. Furthermore, an end part of each core member 39 faces each rotor magnet 37.

A sleeve 40 made of aluminum is approximately cylindrical, and a flange 40a is formed in its lower end part. An outer circumferential surface of this flange 40a contacts to a lower part of the inner circumferential surface 4c of the hub 4 belonging to the sleeve housing 35. The lower surface of the flange 40a contacts to an upper surface of the protrusion 4d of the hub 4. The sleeve 40 with these joints being bonded is fixed inside the sleeve housing 35 of the hub 4.

In the sleeve 40, an outer race holding member 40b holding an outer race 33b in one piece is formed at a position facing the bearing 33 held by the shaft 31. This outer race holding member 40b has an inner diameter formed large in some extent, and hence its inner circumferential surface contacts to an outer circumferential surface of the outer race 33b. Furthermore, a stepped surface 40c formed due to difference of inner diameters contacts to a lower end part of the outer race 33b.

Figure 4:
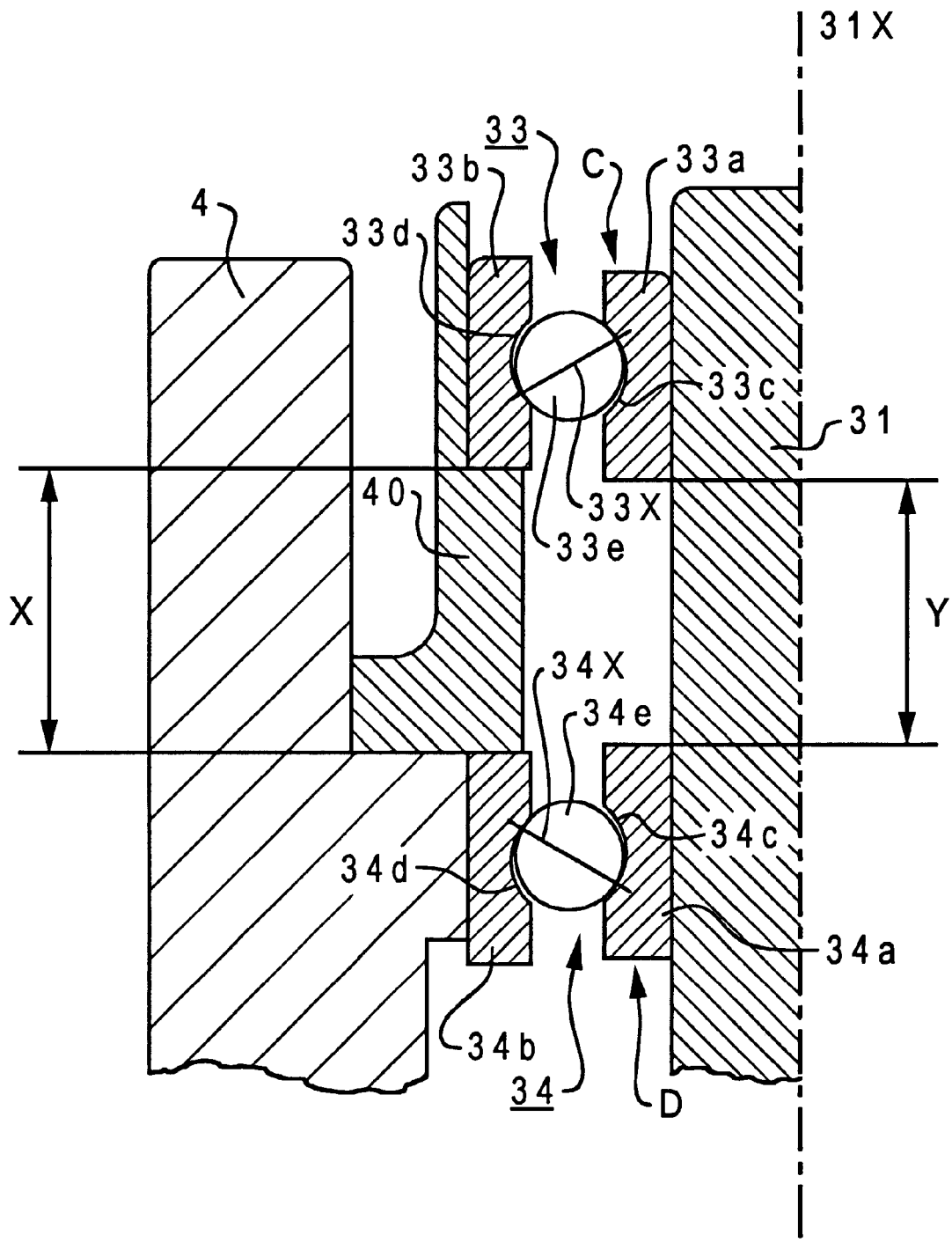
FIG. 4 is an enlarged sectional side view of a bearing mechanism of the spindle motor of FIG. 3.

FIG. 4 is an enlarged view showing a principal part of the bearing mechanism in FIG. 3. Each of a pair of bearings 33 and 34 used in this embodiment is a deep-groove ball bearing, and first, a method for applying a pre-loaded pressure to these bearings 33 and 34 will be described. In addition, a cross-section of only a left half of the bearing mechanism is shown in FIG. 4 for simplification.

In the drawing, each inner diameter of grooves 33c and 33d that are formed in the inner and outer races 33a and 33b of the ball bearing 33, surround and support the ceramic ball 33e, and have circular arc cross-sections is set to be a little larger than an outer diameter of the ceramic ball 33e. In addition, each inner diameter of grooves 34c and 34d that are formed in the inner and outer races 34a and 34b of the ball bearing 34, surround and support the ceramic ball 34e, and have circular arc cross-sections is set to be a little larger than an outer diameter of the ceramic ball 34e.

In order to apply a pre-loaded pressure to bearings in a bearing mechanism having this construction, the inner races 33a and 34a of a pair of ball bearings 33 and 34 are shifted with a predetermined amount of load being applied to the inner races 33a and 34a in directions (shown by arrows C and D) of accessing each other at a predetermined reference temperature as shown in the drawing. Owing to this, an axis 33X connecting contacts of the ceramic ball 33e and an axis 34X connecting contacts of the ceramic ball 34e become slanted to a plane perpendicular to an axis 31X of the shaft 31 respectively. Hence pressures occur at respective contacts, and ball's positions are fixed. In that state, the inner races 33a and 34a are fixed to the shaft 31.

If the pre-loaded pressure is decreased by some reason, it is possible to keep the pre-loaded pressure constant by elongating a distance X between the outer race 33b, held by the sleeve 40, and the outer race 34b held by the hub 4. On the contrary, if the pre-loaded pressure is increased, it is possible to keep the pre-loaded pressure constant by shortening a distance X. The bearing mechanism of the spindle motor 5 shown in FIG. 4 has a construction of keeping the pre-loaded pressure of the bearings 33 and 34 constant by elongation or shrinkage of the sleeve 40 in the direction of the axis 31X.

As described above, each coefficient of linear expansion of the ceramic balls 33e and 34e is smaller than that of bearing steel used for the inner races 33a and 34a and outer races 33b and 34b. Here, it is assumed that both the distance X between the outer races in the sleeve 40 holding the pair of outer races 33b and 34b and the distance Y between the inner races in the shaft 31 holding the pair of inner races 33a and 34a are not changed. Then, if a working temperature becomes higher than the reference temperature at the time when the positions of the inner races and outer races are determined, the pre-loaded pressure is decreased as a temperature rises. On the contrary, if a working temperature becomes lower than the reference temperature described above, the pre-loaded pressure is increased as a temperature falls.

Actually, the coefficient of linear expansion of aluminum used for the sleeve 40 is larger than that of stainless steel used for the shaft 31. Therefore, if the working temperature becomes higher than the reference temperature described above, the relation between the distance Xr between outer races and the distance Yr between the inner races at the reference temperature described above and the distance Xh between outer races and the distance Yh between the inner races at the high temperature becomes (Xh−Xr)>(Yh−Yr). Hence this acts on the increase of the pre-loaded pressure to each of bearings 33 and 34 according as the temperature rises.

In addition, if the working temperature becomes lower than the reference temperature described above, the relation between the distance Xr between outer races and the distance Yr between the inner races at the reference temperature described above and the distance Xl between outer races and the distance Yl between the inner races at the low temperature becomes (Xr−Xl)>(Yr−Yl). Hence this acts on the decrease of the pre-loaded pressure to each of bearings 33 and 34 according as the temperature falls.

Therefore, the difference between size changes of the inner races, outer races, and rolling balls caused by the temperature change is compensated by the difference between axial space changes of bearings. Hence it is possible to keep the pre-loaded pressure approximately constant in spite of the temperature change.

In addition, the coefficient of linear expansion of the sleeve 40 made of aluminum is larger than that of each of the outer races 33b of the bearing and members of the hub 4. Therefore, the sleeve 40 is slightly distorted by a radial action, but it resides within a negligible range by means of axial correction.

As described above, in this embodiment, when a temperature changes, the distance between the outer races of bearings is changed with using the sleeve 40 whose coefficient of linear expansion is larger than that of the shaft 31. Owing to this, a change of a pre-loaded pressure is suppressed, and the change might occur due to such a construction that each rolling ball is formed with a material whose coefficient of linear expansion is smaller than that of each of inner races and outer races. Thus, the sleeve 40 has a role of compensating the difference between size changes of the rolling balls, and the inner races and outer races caused by thermal expansion as a compensation member.

In addition, the sleeve 40 and hub 4 holding the sleeve 40 are formed in one piece with respective outer races of ball bearings 33 and 34, and are equivalent to a supporting member supporting these outer races.

Figure 5:
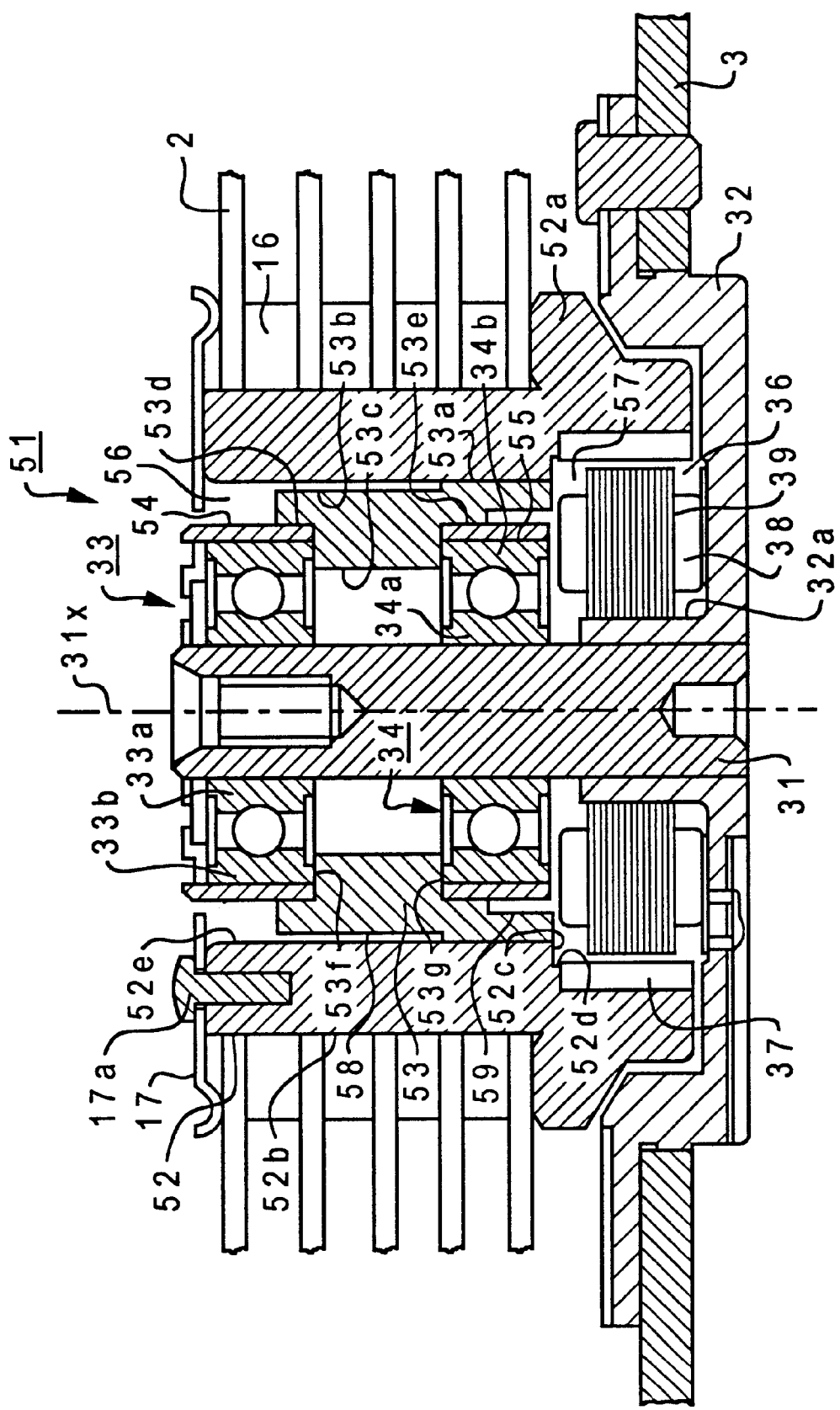
FIG. 5 is a sectional side view of a spindle motor showing a second embodiment of the present invention.

FIG. 5 is a cross-sectional view of a spindle motor 51 showing a second embodiment of the present invention. The same symbols will be assigned to the same components in the first embodiment shown in FIG. 3, their description will be omitted, and only the different parts will be described for their construction.

A hub 52 made of stainless steel is approximately cylindrical, and a flange 52a is formed near a lower end part of its outer circumferential surface 52b. As described above, a plurality of disks 2, whose center holes fit with the outer circumferential surface 52b, are placed on the flange 52a. On the other hand, in its cylindrical inside, a stator coil housing 57 and a sleeve housing 56 are formed, both housings which have inner diameters different from each other and are separated by a stepped part 52c.

Rotor magnets 37 are fixed on an inner circumferential surface 52d of the hub 52 in the stator coil housing 57, and face a predetermined number of the core members 39 fixedly disposed at equal intervals in the circumferential direction, the core members 39 around which the stator coils 38 are wound.

A sleeve 53 made of aluminum is approximately cylindrical. Its outer circumferential surface part 53a one end of which has a diameter larger than that of the other end is joined with an inner circumferential surface 52e of the hub 52 to be in one piece with the hub 52. The other outer circumferential surface part 53b forms a predetermined space 58 so as not to contact to the inner circumferential surface 52e of the hub 52.

On the inner circumferential surface of the sleeve 53, auxiliary sleeves 54 and 55 are made to intervene, the auxiliary sleeves 54 and 55 which are made of stainless steel and cover the outer circumferential surface parts of the outer races 33b and 34b of the bearings 33 and 34 with being respectively caulked with the outer races 33b and 34b. Owing to this, outer race holding members 53d and 53e holding these outer races 33b and 34b are formed.

The outer race holding member 53d has an inner diameter a little larger than that of the sleeve 53, is formed in one end of the sleeve 53 in such depth that one-third of the total depth of the outer race 33b and auxiliary sleeve 54 is fit, and holds these. On the other hand, the outer race holding member 53e has an inner diameter a little larger than that of the sleeve 53, is formed in another end of the sleeve 53 in such depth that the outer race 34b and auxiliary sleeve 55 are fully fit, and holds these. Nevertheless, the outer race holding member 53e contacts to one-third of the outer circumferential surface of the auxiliary sleeve 55 in the side of a stepped surface 53g, holds the auxiliary sleeve 55, and forms a predetermined space 59 so as not to contact to other outer circumferential surfaces.

According to the bearing mechanism of the second embodiment constructed as described above, similarly to the first embodiment described above, the coefficient of linear expansion of the sleeve 53 (aluminum) that determines a distance between the outer races 33b and 34b and acts as a compensation member is larger than that of the shaft 31 (stainless steel) determining a distance between the inner races 33a and 34a. Hence, if a working temperature becomes higher than the reference temperature, this acts on the increase of the pre-loaded pressure according as the temperature rises. If the working temperature becomes lower than the reference temperature, this acts on the decrease of the pre-loaded pressure to each of bearings 33 and 34 according as the temperature falls.

Therefore, the difference between size changes of the inner races, outer races, and rolling balls caused by a temperature change is compensated by the difference between axial size changes of the sleeve 53 and shaft 31. Hence it is possible to keep a pre-loaded pressure approximately constant in spite of the temperature change.

In addition, the space 58 formed by the hub 52 and sleeve 53 is formed so that an axial elongation and shrinkage action of the sleeve 53 may be smoothly performed. Furthermore, the space 59 formed by the sleeve 53 and auxiliary sleeve 55 is formed so as to reduce the distortion occurring when members having coefficients of linear expansion different from each other are jointed.

Moreover, the auxiliary sleeves 54 and 55 made of stainless steel are used as buffering members preventing the radial distortion, caused by the sleeve 53 made of aluminum whose coefficient of linear expansion is large, from directly acting on the outer race 33b of the bearing.

In addition, the sleeve 53, auxiliary sleeves 54 and 55, and hub 52 holding the sleeve 53 are formed in one piece with each outer race of the ball bearings 33 and 34, and are equivalent to supporting members supporting these outer races.

Figure 6:
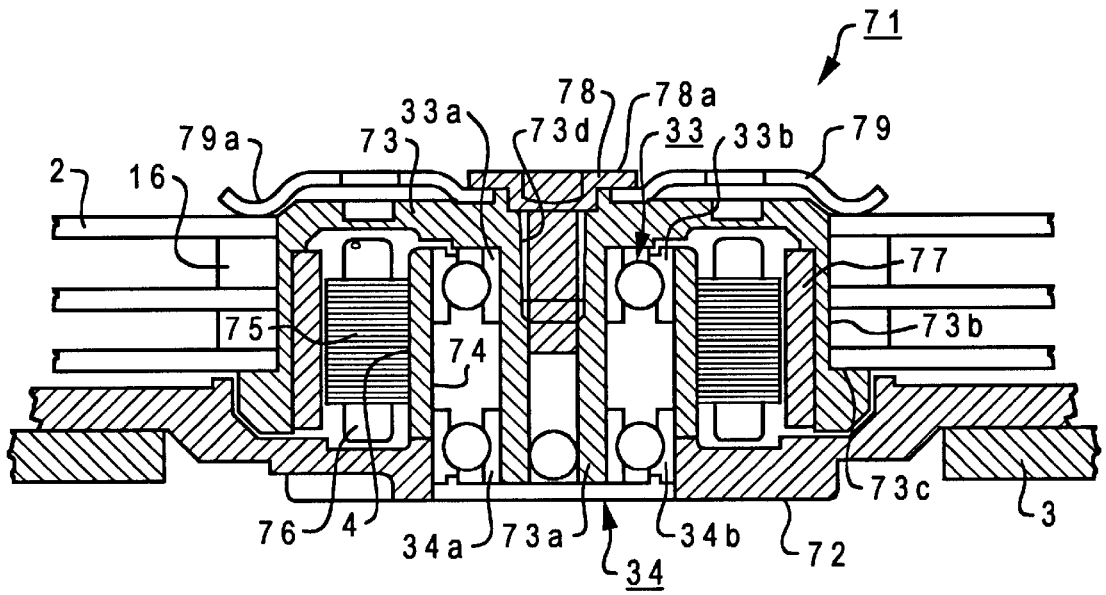
FIG. 6 is a sectional side view of a spindle motor showing a third embodiment of the present invention.
Figure 7:
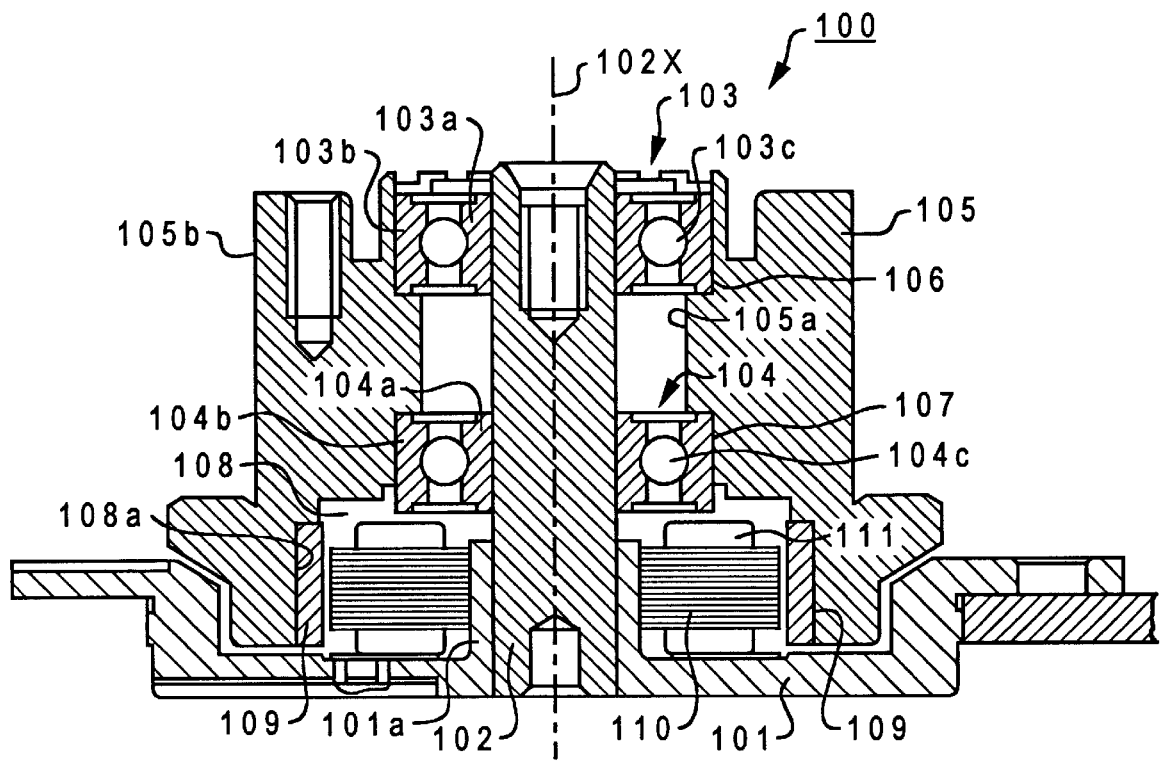
FIG. 7 is a sectional view of a conventional spindle motor used in a hard disk drive.

FIG. 6 is a cross-sectional view of a spindle motor showing a third embodiment of the present invention.

A spindle motor 71 shown here is an inner rotor type. A hub 73 has a center shaft 73a, and bearings 33 and 34 having the construction described above are fixed to this center shaft 73a. A bottom surface part 72 fixed on the base 3 of the hard disk drive fixedly supports a cylindrical sleeve 74 made of aluminum. In this sleeve 74, the outer races 33b and 34b of the bearings 33 and 34 are fixedly disposed at a predetermined distance. In addition, an outer circumferential wall part 73b of the hub 73 fits with the center holes of the disks 2, and holds three disks with the spacers 16 intervening.

On an outer circumferential surface of the cylindrical sleeve 74, a predetermined number of cores 75 and stator coils 76 wound around them are disposed at equal intervals in the circumferential direction. On an inner circumferential surface of the outer circumferential wall part 73b of the hub 73, rotor magnets 77 are disposed at positions near to the stator coils 76 with facing the stator coils 76 respectively.

A pressure bar spring 79 for disks is fixed to the hub 73 by a flange part 78a of a set screw 78 thread-connected with a female screw 73d formed in a center shaft part 73a of the hub 73. An outer circumferential part 79a of the pressure bar spring 79 has a shape curving toward a surface of the disk 2 so as to press the innermost circumferential part of the disk 2. Owing to this, the three disks 2 are sandwiched by the spring 79 and a flange 73c formed in a lower end part of the outer circumferential surface 73b of the hub 73, and rotates with the hub 73 in one piece.

According to the bearing mechanism of the third embodiment constructed as described above, similarly to the embodiments described above, the coefficient of linear expansion of the sleeve 74 (aluminum) that determines a distance between the outer races 33b and 34b is larger than that of the center shaft part 73a (stainless steel) determining a distance between the inner races 33a and 34a. Hence, if a working temperature becomes higher than the reference temperature, this acts on the increase of the pre-loaded pressure according as the temperature rises. If the working temperature becomes lower than the reference temperature, this acts on the decrease of the pre-loaded pressure to each of bearings 33 and 34 according as the temperature falls.

Therefore, the difference between size changes of the inner races, outer races, and rolling balls caused by a temperature change is compensated by the difference between axial size changes of the sleeve 74 and center shaft part 73a that serve as compensation members. Hence it is possible to keep a pre-loaded pressure approximately constant in spite of a temperature change. In addition, this sleeve 74 and bottom surface part 72 are formed with each outer race of the ball bearings 33 and 34 in one piece, and are supporting members supporting these outer races.

Furthermore, although words such as "upper," "lower," and "bottom" are used in the description of each embodiment described above, these are used for the sake of convenience. Therefore, these do not limit the absolute positional relations when a drive is used.

Moreover, although balls are used as rolling balls for a bearing in the embodiments described above, the rolling balls are not limited to these, but the rolling balls can be composed of rollers.

In addition, a material, having a coefficient of thermal expansion larger than that of a shaft determining a distance between inner races, is used as a member changing a distance between outer races in the embodiments described above so as to compensate the difference between size changes caused by a coefficient of thermal expansion of each rolling ball being smaller than each coefficient of thermal expansion of the inner races and outer races. Nevertheless, on the contrary, if a coefficient of thermal expansion of each rolling ball is larger than each coefficient of thermal expansion of the inner races and outer races, it is possible to constitute a bearing mechanism in which a material having a coefficient of thermal expansion smaller than that of a shaft determining a distance between the inner races is used as a member changing a distance between outer races.

According to the present invention, a bearing mechanism changes relative axial positions of inner races and outer races by changing a distance between outer races with using a compensation member having a coefficient of thermal expansion different from that of a shaft determining a distance between inner races. Owing to this, the bearing mechanism compensates the difference between size changes in connection with a temperature change due to such a construction that each rolling ball has a coefficient of thermal expansion smaller than each coefficient of thermal expansion of inner races and outer races. Therefore, it is possible to keep a pre-loaded pressure approximately constant in spite of the temperature change.

What is claimed is:

1. A bearing mechanism, comprising:

first and second bearings disposed at different positions in an axial direction, each of the bearings having an inner race, an outer race, and balls, wherein the balls have a coefficient of linear expansion that is different from a coefficient of linear expansion of the inner and outer races;

a shaft holding the inner races of both bearings in an axially separated manner;

a supporting member for axially separating the outer races of the bearings, wherein, as a temperature of the bearing member changes, the supporting member has a compensation member that changes a distance between the outer races in a changing ratio that differs from a changing ratio of a distance between the inner races; wherein the inner and outer races of each of the bearings are fixed in an axially shifted manner, whereby pre-loaded pressures are applied between the inner races and the balls and between the outer races and the balls; and wherein the supporting member is free of contact with the inner races.

2. The bearing mechanism according to claim 1, wherein the coefficient of linear expansion of the balls is smaller than the coefficient of linear expansion of the inner and outer races, and the compensation member is made of a material having a coefficient of linear expansion that is larger than a coefficient of linear expansion of the shaft.

3. The bearing mechanism according to claim 1, wherein a distance between the inner races of the first and second bearings is smaller than a distance between the outer races of the first and second bearings so as to apply pre-loaded pressure.

4. The bearing mechanism according to claim 1, wherein the inner and outer races are made of bearing steel and the balls are ceramic.

5. The bearing mechanism according to claim 1, wherein the shaft is made of stainless steel and the compensation member is made of aluminum.

6. A spindle motor, comprising:

a bearing mechanism having first and second bearings disposed at different positions in an axial direction, each of the bearings having an inner race, an outer race, and balls, wherein the balls have a coefficient of linear expansion that is different from a coefficient of linear expansion of the inner and outer races;

a shaft holding the inner races of both bearings in an axially separated manner;

a supporting member for axially separating the outer races of the bearings, wherein, as a temperature of the bearing member changes, the supporting member has a compensation member that changes a distance between the outer races in a changing ratio that differs from a changing ratio of a distance between the inner races;

a bottom part fixedly supporting the shaft;

rotor magnets held by the supporting member and disposed along a circumference whose center is a central axis of the shaft;

cores fixedly disposed on the shaft and having stator coils wound around the cores so that end parts of the coils face the rotor magnets, respectively; wherein the inner and outer races of each of the bearings are fixed in an axially shifted manner, whereby pre-loaded pressures are applied between the inner races and the balls and between the outer races and the balls; and wherein the supporting member is free of contact with the inner races.

7. A spindle motor, comprising:

a bearing mechanism having first and second bearings disposed at different positions in an axial direction, each of the bearings having an inner race, an outer race, and balls, wherein the balls have a coefficient of linear expansion that is different from a coefficient of linear expansion of the inner and outer races;

a shaft holding the inner races of both bearings in an axially separated manner;

a supporting member for axially separating the outer races of the bearings, wherein, as a temperature of the bearing member changes, the supporting member has a compensation member that changes a distance between the outer races in a changing ratio that differs from a changing ratio of a distance between the inner races;

a bottom part fixedly supporting the supporting member;

rotor magnets being held by a holding member formed on the shaft in one piece and disposed along the circumference whose center is a central axis of the shaft;

cores that are fixedly disposed on the shaft and have stator coils wound around the cores so that end parts of the coils may face the rotor magnets respectively; wherein the inner and outer races of each of the bearings are fixed in an axially shifted manner, whereby pre-loaded pressures are applied between the inner races and the balls and between the outer races and the balls; and wherein the supporting member is spaced radially apart from the inner races such that the supporting member is free of contact with the inner races.

8. A hard disk drive, comprising:

a spindle motor having a bearing mechanism with first and second bearings disposed at different positions in an axial direction, each of the bearings having an inner race, an outer race, and balls, wherein the balls have a coefficient of linear expansion that is different from a coefficient of linear expansion of the inner and outer races;

a shaft holding the inner races of both bearings in an axially separated manner;

a supporting member for axially separating the outer races of the bearings, wherein, as a temperature of the bearing member changes, the supporting member has a compensation member that changes a distance between the outer races in a changing ratio that differs from a changing ratio of a distance between the inner races;

a bottom part fixedly supporting the shaft;

rotor magnets held by the supporting member and disposed along a circumference whose center is a central axis of the shaft;

cores fixedly disposed on the shaft and having stator coils wound around the cores so that end parts of the coils face the rotor magnets, respectively;

a disk held by a rotary part of the spindle motor and rotating with the rotary part in one piece;

an actuator arm holding a head scanning a recording surface of the disk; wherein the inner and outer races of each of the bearings are fixed in an axially shifted manner, whereby pre-loaded pressures are applied between the inner races and the balls and between the outer races and the balls; and wherein the supporting member is spaced radially apart from the inner races such that the supporting member is free of contact with the inner races.

9. The hard disk drive according to claim 8, comprising a ramp on which an end part of the actuator arm is placed at a position where the head moves out of a recording surface of a disk.

10. A hard disk drive, comprising:

a spindle motor having a bearing mechanism with first and second bearings disposed at different positions in an axial direction, each of the bearings having an inner race, an outer race, and balls, wherein the balls have a coefficient of linear expansion that is different from a coefficient of linear expansion of the inner and outer races;

a shaft holding the inner races of both bearings in an axially separated manner;

a supporting member for axially separating the outer races of the bearings, wherein, as a temperature of the bearing member changes, the supporting member has a compensation member that changes a distance between the outer races in a changing ratio that differs from a changing ratio of a distance between the inner races;

a bottom part fixedly supporting the supporting member;

rotor magnets being held by a holding member formed on the shaft in one piece and disposed along the circumference whose center is a central axis of the shaft;

cores that are fixedly disposed on the shaft and have stator coils wound around the cores so that end parts of the coils may face the rotor magnets respectively;

a disk being held by a rotary part of the spindle motor and rotating with the rotary part in one piece;

an actuator arm holding a head scanning a recording surface of the disk; wherein the inner and outer races of each of the bearings are fixed in an axially shifted manner, whereby pre-loaded pressures are applied between the inner races and the balls and between the outer races and the balls; and wherein the supporting member is spaced radially apart from the inner races such that the supporting member is free of contact with the inner races.

11. The hard disk drive according to claim 10, comprising a ramp on which an end part of the actuator arm is placed at a position where the head moves out of a recording surface of a disk.

* * * * *